United States Patent
Moskovich

(10) Patent No.: US 6,980,365 B2
(45) Date of Patent: Dec. 27, 2005

(54) DIFFRACTIVE LENS OPTICAL DESIGN

(75) Inventor: Jacob Moskovich, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 71 days.

(21) Appl. No.: 10/784,108

(22) Filed: Feb. 20, 2004

(65) Prior Publication Data

US 2004/0174608 A1    Sep. 9, 2004

Related U.S. Application Data

(60) Provisional application No. 60/451,963, filed on Mar. 5, 2003.

(51) Int. Cl.⁷ .............................. G02B 25/00; G02B 5/18
(52) U.S. Cl. ....................... 359/643; 359/558; 359/645; 359/646
(58) Field of Search .............................. 359/643–646, 359/558

(56) References Cited

U.S. PATENT DOCUMENTS

| | | | |
|---|---|---|---|
| 5,044,706 A | 9/1991 | Chen | |
| 5,148,314 A | 9/1992 | Chen | |
| 5,151,823 A * | 9/1992 | Chen | 359/565 |
| 5,206,675 A | 4/1993 | Miyauchi et al. | |
| 5,446,588 A | 8/1995 | Missig et al. | |
| 5,548,439 A | 8/1996 | Smith | |
| 5,822,127 A | 10/1998 | Chen et al. | |
| 5,966,244 A | 10/1999 | Mukai et al. | |
| 5,973,844 A * | 10/1999 | Burger | 359/622 |
| 6,384,982 B1 | 5/2002 | Spitzer | |
| 6,429,954 B1 | 8/2002 | Kasai | |
| 6,618,099 B1 | 9/2003 | Spitzer | |
| 2002/0039232 A1 | 4/2002 | Takeyama | |
| 2003/0030912 A1 | 2/2003 | Moskovich | |

FOREIGN PATENT DOCUMENTS

JP        2003/035869        6/2003

OTHER PUBLICATIONS

PCT Search Report on PCT/US2004/005103.

* cited by examiner

*Primary Examiner*—Scott J. Sugarman
(74) *Attorney, Agent, or Firm*—George W. Jonas

(57) ABSTRACT

An optical system for use in a head-mounted display is provided which includes a microdisplay (4) and a magnifier (10) for producing a magnified image of the microdisplay for viewing by a human eye. The magnifier (10) includes a diffractive surface and has in order: a first element (1) having a first surface (S1) which is convex in the direction of the long conjugate, a block (3) of optical material, and a second element (2) having a second surface (S2) which is convex in the direction of the short conjugate. The first surface (S1) is preferably the diffractive surface. The magnifier provides a long eye relief, a large exit pupil, and a large field of view with a minimum of components.

41 Claims, 1 Drawing Sheet

DIFFRACTIVE LENS OPTICAL DESIGN

CROSS REFERENCE TO RELATED APPLICATION

This application claims the benefit under 35 USC §119(e) of U.S. Provisional Application No. 60/451,963 filed Mar. 5, 2003, the contents of which in its entirety is hereby incorporated by reference.

FIELD OF THE INVENTION

This invention relates to optical designs employing diffractive surfaces and, in particular, to optical designs employing diffractive surfaces for use in head-mounted display systems.

BACKGROUND OF THE INVENTION

Optical systems for use in head-mounted display systems preferably have the following features:

(1) a sufficiently long eye relief to allow for comfortable viewing by a user wearing eyeglasses;
(2) a sufficiently large exit pupil to minimize restrictions on placement of the observer's eye; and
(3) a sufficiently large field of view to provide a comfortably magnified image of the system's microdisplay.

In addition, it is also desirable for the optical system to be light in weight and to fit into an overall package which can be comfortably worn by the user.

Most frequently the microdisplay used in a head-mounted display system is a LCD light valve device. To assure maximum contrast of the image for this type of device, the optical system used to produce a magnified image of the microdisplay is preferably telecentric on its short conjugate side, i.e., the side where the microdisplay is located.

As known in the art, telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity.

In practical applications, a telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have a pupil at a long distance from the lens' elements, and the term "telecentric pupil" is used to describe such a pupil at a long distance from the lens' elements. For the lens systems of the invention, the telecentric pupil distance will in general be at least about two times the lens' focal length.

SUMMARY OF THE INVENTION

In accordance with a first aspect, the invention provides an optical system comprising:

(A) a microdisplay (4); and
(B) a magnifier (10) for producing a magnified image of the microdisplay (4) for viewing by a human eye, said magnifier having a focal length $f_0$, a long conjugate side in the direction of the human eye, a short conjugate side in the direction of the microdisplay, and an f-number f# for light passing from the long conjugate to the short conjugate, said magnifier, in order from the long conjugate side to the short conjugate side, comprising:
(I) a first element (1) having a first surface (S1) which is convex in the direction of the long conjugate, said first element having a focal length $f_1$;
(II) a block (3) of optical material; and
(III) a second element (2) having a second surface (S2) which is convex in the direction of the short conjugate, said second element having a focal length $f_2$;

wherein:
(a) $f_1 > 0$;
(b) $f_2 > 0$;
(c) the first surface (S1) is a diffractive surface, or the second surface (S2) is a diffractive surface, or the magnifier (10) comprises a diffractive surface which is separate from the first and second surfaces;
(d) axial light passing through the optical system from the long conjugate to the short conjugate and converging at the microdisplay has a beam diameter at the diffractive surface whose maximum value is d; and
(e) the beam diameter value d, the focal length $f_0$, and the f-number satisfy the relationship:

$$(f\# \cdot d)/f_0 > 0.4 \text{ (preferably, } (f\# \cdot d)/f_0 > 0.8).$$

In accordance with a second aspect, the invention provides an optical system comprising:

(A) a microdisplay (4); and
(B) a magnifier (10) for producing a magnified image of the microdisplay (4) for viewing by a human eye, said magnifier having a focal length $f_0$, a long conjugate side in the direction of the human eye, and a short conjugate side in the direction of the microdisplay, said magnifier, in order from the long conjugate side to the short conjugate side, comprising:
(I) a first element (1) having a first surface (S1) which is convex in the direction of the long conjugate, said first element having a focal length $f_1$;
(II) a block (3) of optical material; and
(III) a second element (2) having a second surface (S2) which is convex in the direction of the short conjugate, said second element having a focal length $f_2$;

wherein:
(a) $f_1 > 0$;
(b) $f_2 > 0$;
(c) $f_1/f_2 > 1.0$; and
(d) the first surface (S1) is a diffractive surface, or the second surface (S2) is a diffractive surface, or the magnifier comprises a diffractive surface which is separate from the first and second surfaces.

In accordance with a third aspect, the invention provides an optical system comprising:

(A) a microdisplay (4); and
(B) a magnifier (10) for producing a magnified image of the microdisplay (4) for viewing by a human eye, said magnifier having a focal length $f_0$, a long conjugate side in the direction of the human eye, and a short conjugate side in the direction of the microdisplay, said magnifier, in order from the long conjugate side to the short conjugate side, comprising:
(I) a first element (1) having a first surface (S1) which is convex in the direction of the long conjugate, said first element having a focal length $f_1$;

(II) a block (3) of optical material; and
(III) a second element (2) having a second surface (S2) which is convex in the direction of the short conjugate, said second element having a focal length $f_2$;
wherein:
  (a) $f_1 > 0$;
  (b) $f_2 > 0$;
  (c) $f_1/f_0 > 1.3$; and
  (d) the first surface (S1) is a diffractive surface, or the second surface (S2) is a diffractive surface, or the magnifier comprises a diffractive surface which is separate from the first and second surfaces.

In accordance with a fourth aspect, the invention provides an optical system comprising:
(A) a microdisplay (4); and
(B) a magnifier (10) for producing a magnified image of the microdisplay (4) for viewing by a human eye, said magnifier having a long conjugate side in the direction of the human eye, a short conjugate side in the direction of the microdisplay, and, in order from the long conjugate side to the short conjugate side, comprises:
(I) a first element (1) having a first surface (S1) which is convex in the direction of the long conjugate, said first element having a focal length $f_1$;
(II) a block (3) of optical material; and
(III) a second element (2) having a second surface (S2) which is convex in the direction of the short conjugate, said second element having a focal length $f_2$;
wherein:
  (a) $f_1 > 0$;
  (b) $f_2 > 0$; and
  (c) the magnifier comprises a diffractive surface which is closer to the magnifier's long conjugate side than to its short conjugate side.

Preferably, the first surface (S1) is the diffractive surface.

The reference symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification.

BRIEF DESCRIPTION OF THE DRAWINGS

FIG. 1 generally shows the structure of Examples 1A–1F, while FIGS. 2 and 3 show the structure of Examples 2 and 3, respectively.

Figure 1:
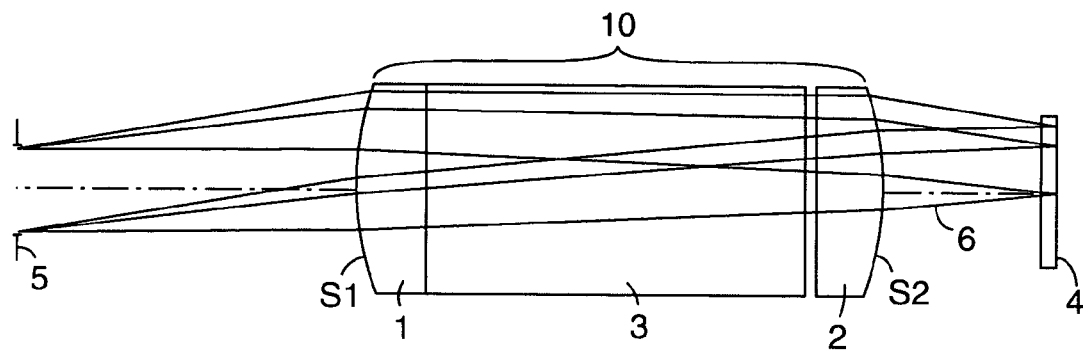
FIGS. 1 through 3 are schematic side views of representative optical systems constructed in accordance with the invention.
Figure 2:
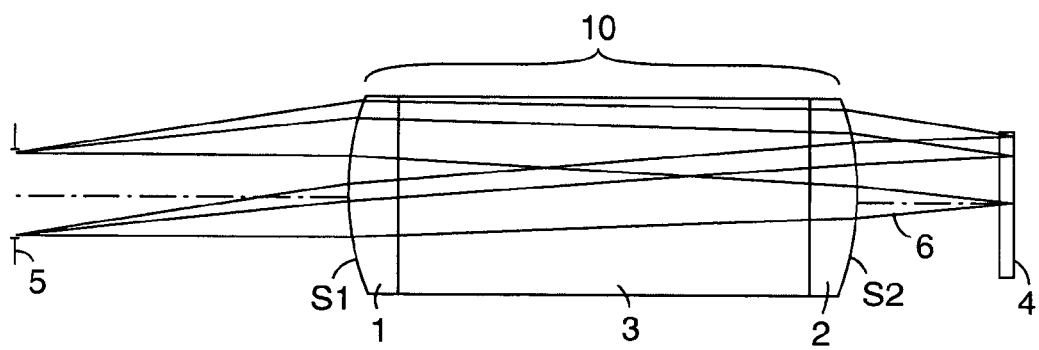
Figure 3:
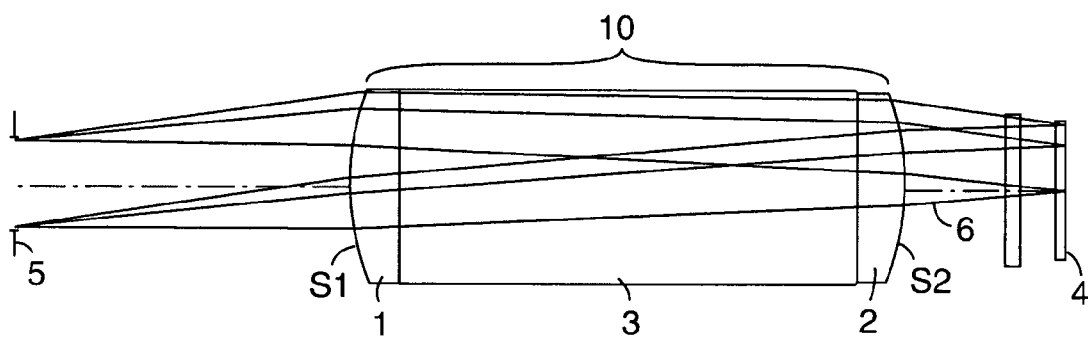

The reference numbers used in the figures correspond to the following:
  1 first element
  2 second element
  3 block of optical material
  4 microdisplay
  5 aperture stop (pupil of user's eye)
  6 axial beam
  10 magnifier

DESCRIPTION OF THE PREFERRED EMBODIMENTS

As discussed above, the present invention provides optical systems for use in, for example, head-mounted display systems. Examples of the types of systems in which the present invention can be used can be found in Spitzer, U.S. Pat. No. 6,384,982 entitled "Compact Image Display System for Eyeglasses or Other Head-Borne Frames," the contents of which are incorporated herein by reference.

In certain embodiments, the magnifier portion of the optical system of the invention comprises two positive elements separated by a block of optical material. In certain preferred embodiments, the magnifier portion consists of just the two positive elements and the block of optical material.

The block of optical material can be cemented to one or both of the positive optical elements. Alternatively, the block of optical material and one or both of the positive optical elements can be formed (e.g., molded) as one solid piece. Forming the entire optical system as a single component can greatly simplify the process of assembling head-mounted display systems during production.

The block of optical material between the positive optical elements is used to lengthen the separation between the elements by a factor proportional to the index of refraction of the material making up the block. This is done to produce an optical system suitable for packaging in a head-mounted display system. To fit various packaging requirements, the optical path through the solid block can be folded.

To minimize the overall weight of the optics, all the optical components, i.e., the first and second elements and the solid block, are preferably made out of plastic, e.g., acrylic.

Aspherical surfaces are used to correct monochromatic aberrations and a diffractive surface is used to provide color correction without the need to include additional elements in the system. For example, each of the positive elements can include an aspheric surface and one of the positive elements can include a diffractive surface. The diffractive surface can also be aspheric if desired.

For systems in which the positive elements are separate components, the aspheric and diffractive surfaces can be on either side of the element, i.e., the side facing the long conjugate end or the short conjugate end of the optical system. When a positive element is combined with the solid block of optical material, the free surface of the element (i.e., the surface not combined with the block) will be either aspheric or aspheric and diffractive. The diffractive surface can be formed on an end surface of the solid block of optical material for systems in which the solid block has a free end surface.

The diffractive surface can be used on either of the positive elements or on either free end surface of the block of optical material for a block having two free end surfaces. Ghosting associated with secondary images in parasitic diffraction orders is minimized when the diffractive surface is farther away from the microdisplay. Thus, a preferred location for the diffractive surface is the element or free surface of the block of optical material that will be closest to the observer's eye during use of the head-mounted display system. For systems in which the positive elements and the solid block are a single component, the diffractive surface is preferably at the end of the component farthest from the microdisplay.

The system preferably includes only one diffractive surface since the presence of multiple diffractive surfaces can result in diffractive interactions which will degrade the image provided to the user.

Without intending to limit it in any manner, the present invention will be more fully described by the following examples.

EXAMPLES

The following Examples 1A–1F, 2, and 3 illustrated optical systems suitable for use in head-mounted display systems where the optical system has the following characteristics:

(1) a field of view of 18°, which corresponds to seeing a 12.5 inch diagonal image at 1 meter away from the viewer;

(2) an exit pupil diameter of 6.0 millimeters for light traveling from the microdisplay to the user's eye; and (3) an eye relief distance of 25.0 millimeters.

The aspheric coefficients set forth in the prescription tables for Examples 1A–1F, 2, and 3 are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the surface at the optical axis, and k is a conic constant, which is zero except where indicated in the prescriptions of Tables 1A–1F, 2, and 3.

The designation "a" associated with various surfaces in the tables represents a surface for which at least one of D, E, F, G, H, or I in the above equation is not zero; and the designation "c" indicates a surface for which k in the above equation is not zero. As used in the claims, an aspheric surface is a surface for which at least one of k, D, E, F, G, H, or I is not zero. The designation "p" used with various of the surfaces in the tables represents a diffractive (phase) surface.

The prescription tables are constructed on the assumption that light travels from left to right in the figures. In actual practice, the user's eye will be on the left and the microdisplay will be on the right, and light will travel from right to left. In particular, the references in the prescription tables to objects/images and entrance/exit pupils are reversed from that used in the rest of this application. All dimensions given in the prescriptions and in Table 4 below are in millimeters. Surface 7 in the prescriptions of Examples 1A–1F, surface 6 in the prescription of Example 2, and surface 8 in the prescription of Example 3 is the cover glass of the microdisplay (imager). Surface 6 in Example 3 is a polarizer used with the imager. The index of refraction and dispersion of the block of optical material in Example 3 is given in standard six digit form, i.e., abcxyz, where n=1.abc and v=xy.z.

The diffractive is formed on surface 5 in Examples 1A–1D, and on surface 2 in Examples 1E–1F, 2, and 3. For Examples 1A–1D, the characteristics of the diffractive surface in ZEMAX terminology are: diff order: 1, scaling (normalized) rad ap: 10, and quadratic phase term: −1907.1553; while for Examples 1E and 3, the characteristics are: diff order: 1, scaling (normalized) rad ap: 10, and P2 & P4 phase terms: −800.0 & 100.0, respectively; and for Examples 1F and 2, the characteristics are: diff order: 1, scaling (normalized) rad ap: 10, and P2 & P4 phase terms: −1200.0 & 100.0, respectively.

The focal lengths and selected other properties of the elements making up the magnifiers of Examples 1A–1F, 2, and 3 are set forth in Table 4, where $f_0$ is the focal length of the system, $f_1$ is the focal length of the element closest to the user's eye, $f_2$ is the focal length of the element closest to the microdisplay, BFL is the paraxial back focal distance at infinity not including the faceplate of the microdisplay, i.e., the distance from the element closest to the microdisplay to the focal plane for light traveling from left to right in the figures, and d is the diameter of the axial beam at the diffractive surface.

As to "T", this parameter is the distance between the first and last optical surfaces of the optical system. To achieve a preferred packaging configuration for a head-mounted display system, it is desirable to separate the components of the optical system by about 30 mm to 35 mm, which is approximately the distance between the optical axis of a user's eye and his or her corresponding temple. Hence, the overall distance between the first and the last surface of the optical system is preferably larger than 30 mm. On the other hand, so that the optical system is not overly long, T is preferably less than 45 mm.

As can be seen from Table 4, $f_0$, $f_1$, and $f_2$ preferably satisfy the following relationships:

$f_1/f_2 > 1.0$; and/or $f_1/f_0 > 1.3$.

For the diffractive surface to be effective in terms of chromatic aberration correction, the minimum diameter of the axial beam at the diffractive surface preferably satisfies the following relationship:

$(f\# \cdot d)/f_0 > 0.4$, where f# is the f-number of the optical system, i.e., the focal length $f_0$ divided by the entrance pupil diameter for light traveling from the long conjugate towards the short conjugate. For each of Examples 1A–1F, 2, and 3, the f# is 5. Most preferably, the diffractive surface is located at a position so that the $(f\# \cdot d)/f_0$ ratio is greater than 0.8.

Although specific embodiments of the invention have been described and illustrated, it is to be understood that a variety of modifications which do not depart from the scope and spirit of the invention will be evident to persons of ordinary skill in the art from the foregoing disclosure.

TABLE 1A

| Surf. No. | Type | Radius | Thickness | Glass | Clear Aperture Diameter |
|---|---|---|---|---|---|
| 1 | | Aperture stop | 25.00000 | | 6.09 |
| 2 | ac | 23.2851 | 5.00000 | ACRYLIC | 14.29 |
| 3 | | ∞ | 28.00000 | ACRYLIC | 14.28 |
| 4 | | ∞ | 0.50000 | | 14.22 |
| 5 | p | ∞ | 5.00000 | ACRYLIC | 14.22 |
| 6 | a | −21.0877 | 11.70000 | | 14.30 |
| 7 | | ∞ | 1.00000 | BSC7 | 10.20 |
| 8 | | ∞ | −0.01315 | | 10.00 |

Symbol Description
a - Polynomial asphere
c - Conic section
p - Phase surface

TABLE 1A-continued

Even Polynomial Aspheres and Conic Constants

| Surf. No. | k | D | E | F |
|---|---|---|---|---|
| 2 | −1.0000E+00 | 1.8457E−05 | −1.1805E−06 | 3.2326E−08 |
| 6 | | 1.1792E−04 | −1.9097E−06 | 3.9462E−08 |

| Surf. No. | G | H | I |
|---|---|---|---|
| 2 | −2.9215E−10 | −1.9562E−12 | 3.4875E−14 |
| 6 | −4.0048E−10 | 4.3344E−13 | 1.5072E−14 |

First Order Data

| | | | |
|---|---|---|---|
| f/number | 5.00 | Overall Length | −923.851 |
| Magnification | 0.0305 | Forward Vertex Distance | 76.1868 |
| Object Height | 160.00 | Barrel Length | 76.2000 |
| Object Distance | 1000.04 | Entrance Pupil Distance | 0.00 |
| Effective Focal Length | 30.0003 | Exit Pupil Distance | 59.8232 |
| Image Distance | −.131546E−01 | Stop Diameter | 6.093 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.21206E−01 | 47.157 |
| 3 | 5 | 6 | 0.26471E−01 | 37.778 |

TABLE 1B

| Surf. No. | Type | Radius | Thickness | Glass | Clear Aperture Diameter |
|---|---|---|---|---|---|
| 1 | | Aperture stop | 25.00000 | | 6.09 |
| 2 | ac | 23.3136 | 5.00000 | ACRYLIC | 14.29 |
| 3 | | ∞ | 28.00000 | ACRYLIC | 14.28 |
| 4 | | ∞ | 0.50000 | | 14.24 |
| 5 | p | ∞ | 5.00000 | ACRYLIC | 14.24 |
| 6 | a | −21.0877 | 11.73460 | | 14.11 |
| 7 | | ∞ | 1.00000 | BSC7 | 10.15 |
| 8 | | ∞ | 0.00420 | | 9.95 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.4796E−05 | −9.7462E−07 | 3.1044E−08 |
| 6 | | 1.1792E−04 | −1.9097E−06 | 3.9462E−08 |

| Surf. No. | G | H | I |
|---|---|---|---|
| 2 | −3.3642E−10 | −2.0677E−12 | 4.4089E−14 |
| 6 | −4.0048E−10 | 4.3344E−13 | 1.5072E−14 |

First Order Data

| | | | |
|---|---|---|---|
| f/number | 5.00 | Overall Length | −924.045 |
| Magnification | 0.0305 | Forward Vertex Distance | 76.2388 |
| Object Height | 160.00 | Barrel Length | 76.2346 |
| Object Distance | 1000.28 | Entrance Pupil Distance | 0.00 |
| Effective Focal Length | 30.0078 | Exit Pupil Distance | 59.8511 |
| Image Distance | 0.419694E−02 | Stop Diameter | 6.095 |

TABLE 1B-continued

| | | | |
|---|---|---|---|
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.21180E−01 | 47.215 |
| 3 | 5 | 6 | 0.26471E−01 | 37.778 |

TABLE 1C

| Surf. No. | Type | Radius | Thickness | Glass | Clear Aperture Diameter |
|---|---|---|---|---|---|
| 1 | | Aperture stop | 25.00000 | | 6.09 |
| 2 | ac | 23.2851 | 3.50000 | ACRYLIC | 14.29 |
| 3 | | ∞ | 31.00000 | ACRYLIC | 14.28 |
| 4 | | ∞ | 0.65000 | | 14.22 |
| 5 | p | ∞ | 3.50000 | ACRYLIC | 14.22 |
| 6 | a | −21.0877 | 11.70000 | | 14.09 |
| 7 | | ∞ | 1.00000 | BSC7 | 10.13 |
| 8 | | ∞ | −0.00967 | | 10.00 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.8457E−05 | −1.1805E−06 | 3.2326E−08 |
| 6 | | 1.1792E−04 | −1.9097E−06 | 3.9462E−08 |

| Surf. No. | G | H | I |
|---|---|---|---|
| 2 | −2.9215E−10 | −1.9562E−12 | 3.4875E−14 |
| 6 | −4.0048E−10 | 4.3344E−13 | 1.5072E−14 |

First Order Data

| | | | |
|---|---|---|---|
| f/number | 5.00 | Overall Length | −927.210 |
| Magnification | 0.0305 | Forward Vertex Distance | 76.3403 |
| Object Height | 160.00 | Barrel Length | 76.3500 |
| Object Distance | 1003.55 | Entrance Pupil Distance | 0.00 |
| Effective Focal Length | 30.1001 | Exit Pupil Distance | 59.3244 |
| Image Distance | −.967404E−02 | Stop Diameter | 6.115 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.21206E−01 | 47.157 |
| 3 | 5 | 6 | 0.26549E−01 | 37.667 |

TABLE 1D

| Surf. No. | Type | Radius | Thickness | Glass | Clear Aperture Diameter |
|---|---|---|---|---|---|
| 1 | | Aperture stop | 25.00000 | | 6.09 |
| 2 | ac | 23.3136 | 3.50000 | ACRYLIC | 14.29 |
| 3 | | ∞ | 31.00000 | ACRYLIC | 14.28 |
| 4 | | ∞ | 0.65000 | | 14.24 |
| 5 | p | ∞ | 3.50000 | ACRYLIC | 14.24 |
| 6 | a | −21.0877 | 11.73460 | | 14.11 |

TABLE 1D-continued

| | | | | |
|---|---|---|---|---|
| 7 | ∞ | 1.00000 | BSC7 | 10.15 |
| 8 | ∞ | 0.00784 | | 10.00 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.4796E−05 | −9.7462E−07 | 3.1044E−08 |
| 6 | | 1.1792E−04 | −1.9097E−06 | 3.9462E−08 |

| Surf. No. | G | H | I |
|---|---|---|---|
| 2 | −3.3642E−10 | −2.0677E−12 | 4.4089E−14 |
| 6 | −4.0048E−10 | 4.3344E−13 | 1.5072E−14 |

First Order Data

| | | | |
|---|---|---|---|
| f/number | 5.00 | Overall Length | −927.398 |
| Magnification | 0.0305 | Forward Vertex Distance | 76.3924 |
| Object Height | 160.00 | Barrel Length | 76.3846 |
| Object Distance | 1003.79 | Entrance Pupil Distance | 0.00 |
| Effective Focal Length | 30.1075 | Exit Pupil Distance | 59.3507 |
| Image Distance | 0.783791E−02 | Stop Diameter | 6.116 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.21180E−01 | 47.215 |
| 3 | 5 | 6 | 0.26549E−01 | 37.667 |

TABLE 1E

| Surf. No. | Type | Radius | Thickness | Glass | Clear Aperture Diameter |
|---|---|---|---|---|---|
| 1 | | Aperture stop | 25.00000 | | 6.09 |
| 2 | acp | 23.3136 | 3.50000 | ACRYLIC | 14.29 |
| 3 | | ∞ | 31.00000 | ACRYLIC | 14.28 |
| 4 | | ∞ | 0.65000 | | 14.30 |
| 5 | | ∞ | 3.50000 | ACRYLIC | 14.24 |
| 6 | a | −21.0877 | 11.10000 | | 14.11 |
| 7 | | ∞ | 1.00000 | BSC7 | 10.15 |
| 8 | | ∞ | 0.02818 | | 10.00 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.4796E−05 | −9.7462E−07 | 3.1044E−08 |
| 6 | | 1.1792E−04 | −1.9097E−06 | 3.9462E−08 |

| Surf. No. | G | H | I |
|---|---|---|---|
| 2 | −3.3642E−10 | −2.0677E−12 | 4.4089E−14 |
| 6 | −4.0048E−10 | 4.3344E−13 | 1.5072E−14 |

TABLE 1E-continued

First Order Data

| | | | |
|---|---|---|---|
| f/number | 5.00 | Overall Length | −956.598 |
| Magnification | 0.0305 | Forward Vertex Distance | 75.7782 |
| Object Height | 160.00 | Barrel Length | 75.7500 |
| Object Distance | 1032.38 | Entrance Pupil Distance | 0.00 |
| Effective Focal Length | 31.0579 | Exit Pupil Distance | 75.7006 |
| Image Distance | 0.281843E−01 | Stop Diameter | 6.290 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.22570E−01 | 44.306 |
| 3 | 5 | 6 | 0.23415E−01 | 42.707 |

TABLE 1F

| Surf. No. | Type | Radius | Thickness | Glass | Clear Aperture Diameter |
|---|---|---|---|---|---|
| 1 | | Aperture stop | 25.00000 | | 6.09 |
| 2 | acp | 23.3136 | 3.50000 | ACRYLIC | 14.29 |
| 3 | | ∞ | 31.00000 | ACRYLIC | 14.28 |
| 4 | | ∞ | 0.65000 | | 14.30 |
| 5 | | ∞ | 3.50000 | ACRYLIC | 14.24 |
| 6 | a | −21.0877 | 10.50000 | | 14.11 |
| 7 | | ∞ | 1.00000 | BSC7 | 10.15 |
| 8 | | ∞ | −0.02904 | | 10.00 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.4796E−05 | −9.7462E−07 | 3.1044E−08 |
| 6 | | 1.1792E−04 | −1.9097E−06 | 3.9462E−08 |

| Surf. No. | G | H | I |
|---|---|---|---|
| 2 | −3.3642E−10 | −2.0677E−12 | 4.4089E−14 |
| 6 | −4.0048E−10 | 4.3344E−13 | 1.5072E−14 |

First Order Data

| | | | |
|---|---|---|---|
| f/number | 5.00 | Overall Length | −948.861 |
| Magnification | 0.0305 | Forward Vertex Distance | 75.1210 |
| Object Height | 160.00 | Barrel Length | 75.1500 |
| Object Distance | 1023.98 | Entrance Pupil Distance | 0.00 |
| Effective Focal Length | 30.7991 | Exit Pupil Distance | 73.8276 |
| Image Distance | −.290390E−01 | Stop Diameter | 6.239 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.23266E−01 | 42.982 |
| 3 | 5 | 6 | 0.23415E−01 | 42.707 |

TABLE 2

| Surf. No. | Type | Radius | Thickness | Glass | Clear Aperture Diameter |
|---|---|---|---|---|---|
| 1 | | Aperture stop | 25.00000 | | 6.09 |
| 2 | acp | 23.3136 | 3.50000 | ACRYLIC | 14.29 |
| 3 | | ∞ | 31.00000 | ACRYLIC | 14.28 |
| 4 | | ∞ | 3.50000 | ACRYLIC | 14.24 |
| 5 | a | −21.0877 | 10.50000 | | 14.11 |
| 6 | | ∞ | 1.00000 | BSC7 | 10.15 |
| 7 | | ∞ | 0.31123 | | 10.00 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.4796E−05 | −9.7462E−07 | 3.1044E−08 |
| 5 | | 1.1792E−04 | −1.9097E−06 | 3.9462E−08 |

| Surf. No. | G | H | I |
|---|---|---|---|
| 2 | −3.3642E−10 | −2.0677E−12 | 4.4089E−14 |
| 5 | −4.0048E−10 | 4.3344E−13 | 1.5072E−14 |

First Order Data

| | | | |
|---|---|---|---|
| f/number | 5.00 | Overall Length | −937.929 |
| Magnification | 0.0305 | Forward Vertex Distance | 74.8112 |
| Object Height | 160.00 | Barrel Length | 74.5000 |
| Object Distance | 1012.74 | Entrance Pupil Distance | 0.00 |
| Effective Focal Length | 30.4668 | Exit Pupil Distance | 74.4743 |
| Image Distance | 0.311233 | Stop Diameter | 6.171 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.23266E−01 | 42.982 |
| 3 | 4 | 5 | 0.23415E−01 | 42.707 |

TABLE 3

| Surf. No. | Type | Radius | Thickness | Glass | Clear Aperture Diameter |
|---|---|---|---|---|---|
| 1 | | Aperture stop | 25.00000 | | 6.55 |
| 2 | acp | 23.3136 | 3.50000 | ACRYLIC | 14.38 |
| 3 | | ∞ | 34.00000 | 533558 | 14.33 |
| 4 | | ∞ | 3.50000 | ACRYLIC | 13.71 |
| 5 | a | −21.0877 | 7.67000 | | 13.66 |
| 6 | | ∞ | 1.00000 | BSC7 | 11.12 |
| 7 | | ∞ | 2.60000 | | 10.94 |
| 8 | | ∞ | 0.70000 | BSC7 | 10.21 |
| 9 | | ∞ | 0.00187 | | 10.09 |

Symbol Description
a - Polynomial asphere
c - Conic section
p - Phase surface

Even Polynomial Aspheres and Conic Constants

| Surf. No. | k | D | E | F |
|---|---|---|---|---|
| 2 | −1.0000E+00 | 1.4796E−05 | −9.7462E−07 | 3.1044E−08 |
| 5 | | 1.1792E−04 | −1.9097E−06 | 3.9462E−08 |

| Surf. No. | G | H | I |
|---|---|---|---|
| 2 | −3.3642E−10 | −2.0677E−12 | 4.4089E−14 |
| 5 | −4.0048E−10 | 4.3344E−13 | 1.5072E−14 |

First Order Data

| | | | |
|---|---|---|---|
| f/number | 5.00 | Overall Length | −967.869 |
| Magnification | 0.0305 | Forward Vertex Distance | 77.9719 |
| Object Height | 160.00 | Barrel Length | 77.9700 |
| Object Distance | 1045.84 | Entrance Pupil Distance | 0.00 |
| Effective Focal Length | 31.4555 | Exit Pupil Distance | 75.2397 |
| Image Distance | 0.187063E−02 | Stop Diameter | 6.372 |
| Stop Surface Number | 1 | Distance to Stop | 0.00 |

First Order Properties of Elements

| Element Number | Surface Numbers | | Power | f' |
|---|---|---|---|---|
| 1 | 2 | 3 | 0.22570E−01 | 44.306 |
| 3 | 4 | 5 | 0.23415E−01 | 42.707 |

TABLE 4

| Ex. No. | f0 | f1 | f2 | T | BFL | d |
|---|---|---|---|---|---|---|
| 1A | 30.0 | 47.16 | 37.78 | 38.50 | 13.26 | 3.00 |
| 1B | 30.0 | 47.21 | 37.78 | 38.50 | 13.31 | 2.97 |
| 1C | 30.1 | 47.16 | 37.67 | 38.65 | 13.27 | 2.82 |
| 1D | 30.1 | 47.21 | 37.67 | 38.65 | 13.32 | 2.83 |
| 1E | 31.1 | 44.31 | 42.71 | 38.65 | 12.94 | 6.12 |
| 1F | 30.8 | 42.98 | 42.71 | 38.65 | 12.07 | 6.24 |
| 2 | 30.5 | 42.98 | 42.71 | 38.00 | 12.40 | 6.17 |
| 3 | 31.5 | 44.31 | 42.71 | 41.00 | 12.35 | 6.20 |

What is claimed is:

1. An optical system comprising:

(A) a microdisplay; and (B) a magnifier for producing a magnified image of the microdisplay for viewing by a human eye, said magnifier having a focal length fo, a long conjugate side in the direction of the human eye, a short conjugate side in the direction of the microdisplay, and an f-number f# for light passing from the long conjugate to the short conjugate, said magnifier, in order from the long conjugate side to the short conjugate side, comprising:

(I) a first element having a first surface which is convex in the direction of the long conjugate, said first element having a focal length $f_1$;

(II) a block of optical material; and (III) a second element having a second surface which is convex in the direction of the short conjugate, said second element having a focal length $f_2$;

wherein:

(a) $f_1 > 0$;

(b) $f_2 > 0$;

(c) the first surface is a diffractive surface, or the second surface is a diffractive surface, or the magnifier comprises a diffractive surface which is separate from the first and second surfaces;

(d) axial light passing through the optical system from the long conjugate to the short conjugate and converging at the microdisplay has a beam diameter at the diffractive surface whose maximum value is d; and (e) the beam diameter value d, the focal length $f_0$, and the f-number satisfy the relationship:

$$(f\# \cdot d)/f_0 > 0.4.$$

2. The optical system of claim 1 wherein the beam diameter value d, the focal length fo, and the f-number satisfy the relationship:

$$(f\# \cdot d)/f_0 > 0.8.$$

3. The optical system of claim 1 wherein:

$$f_1/f_2 > 1.0.$$

4. The optical system of claim 1 wherein:

$$f_1/f_0 > 1.3.$$

5. The optical system of claim 1 wherein:

$$f_1/f_2 > 1.0; \text{ and}$$

$$f_1/f_0 > 1.3.$$

6. The optical system of claim 1 wherein the diffractive surface is closer to the magnifier's long conjugate side than to its short conjugate side.

7. The optical system of claim 6 wherein the first surface is the diffractive surface.

8. The optical system of claim 7 wherein the first surface is both diffractive and aspheric.

9. The optical system of claim 1 wherein the first and second surfaces are aspheric.

10. The optical system of claim 1 wherein the magnifier is telecentric on its short conjugate side.

11. The optical system of claim 1 wherein the first element, the block of optical material, and the second element are molded as one solid piece.

12. The optical system of claim 1 wherein the optical path through the block of optical material is folded.

13. The optical system of claim 1 wherein the distance T between the first and second surfaces satisfies the relationship:

$$30 \text{ millimeters} \leq T \leq 45 \text{ millimeters}.$$

14. An optical system comprising:
(A) a microdisplay; and
(B) a magnifier for producing a magnified image of the microdisplay for viewing by a human eye, said magnifier having a focal length $f_0$, a long conjugate side in the direction of the human eye, and a short conjugate side in the direction of the microdisplay, said magnifier, in order from the long conjugate side to the short conjugate side, comprising:
(I) a first element having a first surface which is convex in the direction of the long conjugate, said first element having a focal length $f_1$;
(II) a block of optical material; and
(III) a second element having a second surface which is convex in the direction of the short conjugate, said second element having a focal length $f_2$;
wherein:
(a) $f_1 > 0$;
(b) $f_2 > 0$;
(c) $f_1/f_2 > 1.0$; and
(d) the first surface is a diffractive surface, or the second surface is a diffractive surface, or the magnifier comprises a diffractive surface which is separate from the first and second surfaces.

15. The optical system of claim 14 wherein:

$$f_1/f_0 > 1.3.$$

16. The optical system of claim 14 wherein the diffractive surface is closer to the magnifier's long conjugate side than to its short conjugate side.

17. The optical system of claim 16 wherein the first surface is the diffractive surface.

18. The optical system of claim 17 wherein the first surface is both diffractive and aspheric.

19. The optical system of claim 14 wherein the first and second surfaces are aspheric.

20. The optical system of claim 14 wherein the magnifier is telecentric on its short conjugate side.

21. The optical system of claim 14 wherein the first element, the block of optical material, and the second element are molded as one solid piece.

22. The optical system of claim 14 wherein the optical path through the block of optical material is folded.

23. The optical system of claim 14 wherein the distance T between the first and second surfaces satisfies the relationship:

$$30 \text{ millimeters} \leq T \leq 45 \text{ millimeters}.$$

24. An optical system comprising:
(A) a microdisplay; and
(B) a magnifier for producing a magnified image of the microdisplay for viewing by a human eye, said magnifier having a focal length $f_0$, a long conjugate side in the direction of the human eye, and a short conjugate side in the direction of the microdisplay, said magnifier, in order from the long conjugate side to the short conjugate side, comprising:
(I) a first element having a first surface which is convex in the direction of the long conjugate, said first element having a focal length $f_1$;
(II) a block of optical material; and
(III) a second element having a second surface which is convex in the direction of the short conjugate, said second element having a focal length $f_2$;
wherein:
(a) $f_1 > 0$;
(b) $f_2 > 0$;
(c) $f_1/f_0 > 1.3$; and
(d) the first surface is a diffractive surface, or the second surface is a diffractive surface, or the magnifier comprises a diffractive surface which is separate from the first and second surfaces.

25. The optical system of claim 24 wherein the diffractive surface is closer to the magnifier's long conjugate side than to its short conjugate side.

26. The optical system of claim 25 wherein the first surface is the diffractive surface.

27. The optical system of claim 26 wherein the first surface is both diffractive and aspheric.

28. The optical system of claim 24 wherein the first and second surfaces are aspheric.

29. The optical system of claim 24 wherein the magnifier is telecentric on its short conjugate side.

30. The optical system of claim 24 wherein the first element, the block of optical material, and the second element are molded as one solid piece.

31. The optical system of claim 24 wherein the optical path through the block of optical material is folded.

32. The optical system of claim 24 wherein the distance T between the first and second surfaces satisfies the relationship:

$$30 \text{ millimeters} \leq T \leq 45 \text{ millimeters}.$$

33. An optical system comprising:

(A) a microdisplay; and (B) a magnifier for producing a magnified image of the microdisplay for viewing by a human eye, said magnifier having a long conjugate side in the direction of the human eye, a short conjugate side in the direction of the microdisplay, and, in order from the long conjugate side to the short conjugate side, comprises:

(I) a first element having a first surface which is convex in the direction of the long conjugate, said first element having a focal length $f_1$;

(II) a block of optical material; and (III) a second element having a second surface which is convex in the direction of the short conjugate, said second element having a focal length $f_2$;

wherein:

(a) $f_1 > 0$;

(b) $f_2 > 0$; and (c) the magnifier comprises a diffractive surface which is closer to the magnifier's long conjugate side than to its short conjugate side.

34. The optical system of claim 33 wherein the first surface is the diffractive surface.

35. The optical system of claim 34 wherein the first surface is both diffractive and aspheric.

36. The optical system of claim 33 wherein:

(a) the block of optical material has a long conjugate surface;

(b) the first element has a long conjugate surface and a short conjugate surface, the long conjugate surface being the first surface;

(c) the short conjugate surface of the first element is spaced from the long conjugate surface of the block of optical material; and (d) the short conjugate surface of the first element or the long conjugate surface of the block of optical material is the diffractive surface.

37. The optical system of claim 33 wherein the first and second surfaces are aspheric.

38. The optical system of claim 33 wherein the magnifier is telecentric on its short conjugate side.

39. The optical system of claim 33 wherein the first element, the block of optical material, and the second element are molded as one solid piece.

40. The optical system of claim 33 wherein the optical path through the block of optical material is folded.

41. The optical system of claim 33 wherein the distance T between the first and second surfaces satisfies the relationship:

30 millimeters $\leq T \leq$ 45 millimeters.

* * * * *